United States Patent
Ayichew (10) Patent No.: US 9,610,927 B2
(45) Date of Patent: Apr. 4, 2017

(54) SYSTEMS AND METHODS FOR ELECTRIC BRAKE FORCE ESTIMATION TOLERANT TO DRIVETRAIN STICTION

(71) Applicant: Goodrich Corporation, Charlotte, NC (US)

(72) Inventor: Efrem E. Ayichew, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 80 days.

(21) Appl. No.: 14/752,611

(22) Filed: Jun. 26, 2015

(65) Prior Publication Data

US 2016/0375881 A1    Dec. 29, 2016

(51) Int. Cl.
| | | |
|---|---|---|
| G06F 7/70 | (2006.01) | |
| B60T 8/172 | (2006.01) | |
| B60T 8/17 | (2006.01) | |
| B60T 8/171 | (2006.01) | |

(52) U.S. Cl.
CPC ............. B60T 8/172 (2013.01); B60T 8/171 (2013.01); B60T 8/1703 (2013.01)

(58) Field of Classification Search
CPC . B60T 8/172; B60T 8/171; B60T 8/17; B60T 17/22
USPC ..................... 701/70, 71, 74; 91/1
See application file for complete search history.

(56) References Cited

U.S. PATENT DOCUMENTS

| | | | | |
|---|---|---|---|---|
| 6,480,130 B1* | 11/2002 | Hanson | ................ | B60T 13/741 188/71.5 |
| 7,108,107 B2 | 9/2006 | Ralea et al. | | |
| 7,317,981 B2 | 1/2008 | Evans et al. | | |
| 7,458,442 B2* | 12/2008 | Kolberg | ................ | F16D 49/00 188/1.11 E |
| 8,177,308 B2 | 5/2012 | Ralea | | |
| 2005/0269872 A1 | 12/2005 | Ralea | | |
| 2006/0060078 A1* | 3/2006 | Deller | .................. | F15B 19/005 91/1 |
| 2012/0145490 A1* | 6/2012 | Clary | .................... | B60T 8/1703 188/1.11 E |
| 2015/0151728 A1* | 6/2015 | Iordanidis | ................ | B60T 8/17 701/3 |
| 2015/0204398 A1* | 7/2015 | Qiang | ..................... | F16D 55/40 188/71.5 |

* cited by examiner

Primary Examiner — Thomas G Black
Assistant Examiner — Luke Huynh
(74) Attorney, Agent, or Firm — Snell & Wilmer L.L.P.

(57) ABSTRACT

The present disclosure provides systems and methods for stiction tolerant brake force estimation. In various embodiments, a method for stiction tolerant brake force estimation may comprise receiving, by a controller, a first motor state at a first time, calculating, by the controller, a first uncompensated brake force estimate based upon the first motor state, calculating, by the controller, a first linear speed based upon the first motor state, and calculating, by the controller, a first stiction compensated brake force estimate based upon at least one of the first linear speed and the first uncompensated brake force estimate.

20 Claims, 5 Drawing Sheets

SYSTEMS AND METHODS FOR ELECTRIC BRAKE FORCE ESTIMATION TOLERANT TO DRIVETRAIN STICTION

FIELD

The present disclosure relates to aircraft braking force control systems, and more specifically, to systems and methods for stiction fault tolerant brake actuator operation.

BACKGROUND

Typically, an aircraft may comprise four electro-mechanical brake actuators (EBA) that are configured to apply force to a brake stack on an aircraft wheel. A position sensor may be coupled to the EBA in order to provide feedback in regards to the translational displacement of a ball nut. A high level command, such as brake pedal deflection from the cockpit, for example, may send a signal to an electro-mechanical brake actuator controller (EBAC), which in turn gets sent to the EBA, which in turn applies a force on the brake stack in order to decrease the radial velocity of the wheel. During an event where there is stiction in the geared drivetrain, and when direct force measurement is not desired due to component reliability concerns, it may become difficult to properly infer the EBA applied force.

SUMMARY

In various embodiments, the present disclosure provides systems and methods for stiction fault tolerant brake force estimation. In various embodiments, a method for stiction tolerant brake force estimation may comprise: receiving, by the controller, a first motor state at a first time, calculating, by the controller, a first uncompensated brake force estimate based upon the first motor state, calculating, by the controller, a first linear speed based upon the first motor state, and calculating, by the controller, a first stiction compensated brake force estimate based upon at least one of the first linear speed and the first uncompensated brake force estimate. In various embodiments, the method may further comprise: receiving, by the controller, a second motor state at a second time, calculating, by the controller, a second uncompensated brake force estimate based upon the second motor state, calculating, by the controller, a second linear speed based upon the second motor state, and calculating, by the controller, a second stiction compensated brake force estimate based upon at least one of the second linear speed and the second uncompensated brake force estimate. In various embodiments, a brake force rate of change may be calculated by calculating a difference between the first stiction compensated brake force estimate and the second uncompensated brake force estimate, wherein a rate of change limiter uses the brake force rate of change to calculate a limited brake force rate of change, wherein an integrator calculates the second stiction compensated brake force estimate by integrating the limited brake force rate of change over a specified domain. In various embodiments, the specified domain may comprise a difference between the second time and the first time. In various embodiments, the limiter may use the second linear speed to determine the limited brake force rate of change. In various embodiments, the first linear speed and the second linear speed may comprise a linear speed of a ball nut. In various embodiments, the first motor state and the second motor state may comprise at least one of a motor angular velocity, a motor temperature, a motor supply voltage, or a motor supply current.

In various embodiments, a system for stiction tolerant brake force estimation is provided. A system for stiction tolerant brake force estimation may comprise a controller configured to receive a motor state and a tangible, non-transitory memory configured to communicate with the controller. The tangible, non-transitory memory may have instructions stored thereon that, in response to execution by the controller, cause the controller to perform operations comprising: receiving, by the controller, a first motor state at a first time, calculating, by the controller, a first uncompensated brake force estimate based upon the first motor state, calculating, by the controller, a first linear speed based upon the first motor state, and calculating, by the controller, a first stiction compensated brake force estimate based upon at least one of the first linear speed and the first uncompensated brake force estimate. In various embodiments, the tangible, non-transitory memory may have instructions stored thereon further comprising: receiving, by the controller, a second motor state at a second time, calculating, by the controller, a second uncompensated brake force estimate based upon the second motor state, calculating, by the controller, a second linear speed based upon the second motor state, and calculating, by the controller, a second stiction compensated brake force estimate based upon at least one of the second linear speed and the second uncompensated brake force estimate. In various embodiments, the tangible, non-transitory memory may have instructions stored thereon further comprising: calculating, by the controller, a brake force rate of change, wherein the brake force rate of change is calculated by calculating a difference between the first stiction compensated brake force estimate and the second uncompensated brake force estimate, calculating, by the controller, a limited brake force rate of change, the limited brake force rate of change being limited according to a drive train speed, and calculating, by the controller, an integral of the limited brake force rate of change over a specified domain, wherein the resulting integral is the second stiction compensated brake force estimate. In various embodiments, the specified domain may comprise a difference between the second time and the first time. In various embodiments, the second linear speed may be used to determine the limited brake force rate of change. In various embodiments, the system for stiction tolerant brake force estimation may further comprise an electro-mechanical brake actuator (EBA). The EBA may comprise a motor, wherein a motor shaft is coupled to the motor, a ball screw, and a ball nut, wherein the ball nut is in communication with the ball screw. In various embodiments, the first motor state and the second motor state may comprise at least one of a motor angular velocity, a motor temperature, a motor supply voltage, and a motor supply current. In various embodiments, the first uncompensated brake force estimate and the second uncompensated brake force estimate may be based upon the motor angular velocity.

In various embodiments, a tangible, non-transitory memory is provided. In various embodiments, a tangible, non-transitory memory may be configured to communicate with a controller. The tangible, non-transitory memory may have instructions stored thereon that, in response to execution by the controller, cause the controller to perform operations comprising, receiving, by the controller, a first motor state at a first time, calculating, by the controller, a first uncompensated brake force estimate based upon the first motor state, calculating, by the controller, a first linear speed based upon the first motor state, and calculating, by the controller, a first stiction compensated brake force estimate based upon at least one of the first linear speed and the first uncompensated brake force estimate. In various embodiments, the tangible, non-transitory memory may have instructions stored thereon further comprising: receiving, by the controller, a second motor state at a second time, calculating, by the controller, a second uncompensated brake force estimate based upon the second motor state, calculating, by the controller, a second linear speed based upon the second motor state, and calculating, by the controller, a second stiction compensated brake force estimate based upon at least one of the second linear speed and the second uncompensated brake force estimate. In various embodiments, the tangible, non-transitory memory may have instructions stored thereon further comprising: calculating, by the controller, a brake force rate of change, wherein the brake force rate of change is calculated by calculating a difference between the first stiction compensated brake force estimate and the second uncompensated brake force estimate, calculating, by the controller, a limited brake force rate of change, the limited brake force rate of change being limited according to a drive train speed, and calculating, by the controller, an integral of the limited brake force rate of change over a specified domain, wherein the resulting integral is the second stiction compensated brake force estimate. In various embodiments, the second linear speed may be used to determine the limited brake force rate of change. In various embodiments, the first motor state and the second motor state may comprise at least one of a motor angular velocity, a motor temperature, a motor supply voltage, and a motor supply current.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step.

As used herein, "electronic communication" means communication of electronic signals with physical coupling (e.g., "electrical communication" or "electrically coupled"), without physical coupling and via an electromagnetic field (e.g., "inductive communication" or "inductively coupled" or "inductive coupling"), or without physical coupling and via an electric field (e.g., "RF communication" or "wireless communication").

In various embodiments, systems with feedback control may become compromised if a sensor which provides feedback provides faulty information. Typically, an aircraft brake assembly comprises a motor, a rotary gear train, a translational gear train or ball screw, and a brake stack. Friction (or stiction) within the gear trains may cause a momentary stop-skid behavior. In the event that one of the gear trains experiences stiction, the motor may momentarily decrease angular velocity or stop spinning altogether. When sensors in electrical communication with the motor are used to calculate a compensated brake force, stiction may cause momentary miscalculations of the compensated brake force. Various systems and methods to address these challenges are presented herein. For instance, a system may be configured to store historical data from a sensor and use a rate of change limiter to prevent abrupt changes in brake force.

Various embodiments include an aircraft electro-mechanical brake actuator controller (EBAC). The EBAC involves the transmission of power and data across a system of circuits and wires. According to instructions stored thereon, a tangible, non-transitory memory may be configured to communicate with the EBAC. In various embodiments, the EBAC may be implemented in a single processor. In various embodiments, the EBAC may be implemented on multiple processors.

Brake control can be determined using feedback from various sensors located on an electro-mechanical brake actuator (EBA), including motor voltage sensors, motor currents sensors, motor temperature sensors, and position sensors. While described in the context of aircraft applications, and more specifically, in the context of brake control using feedback from various sensors located on an electro-mechanical brake actuator (EBA), the various embodiments of the present disclosure may be applied to any suitable application.

Figure 1:
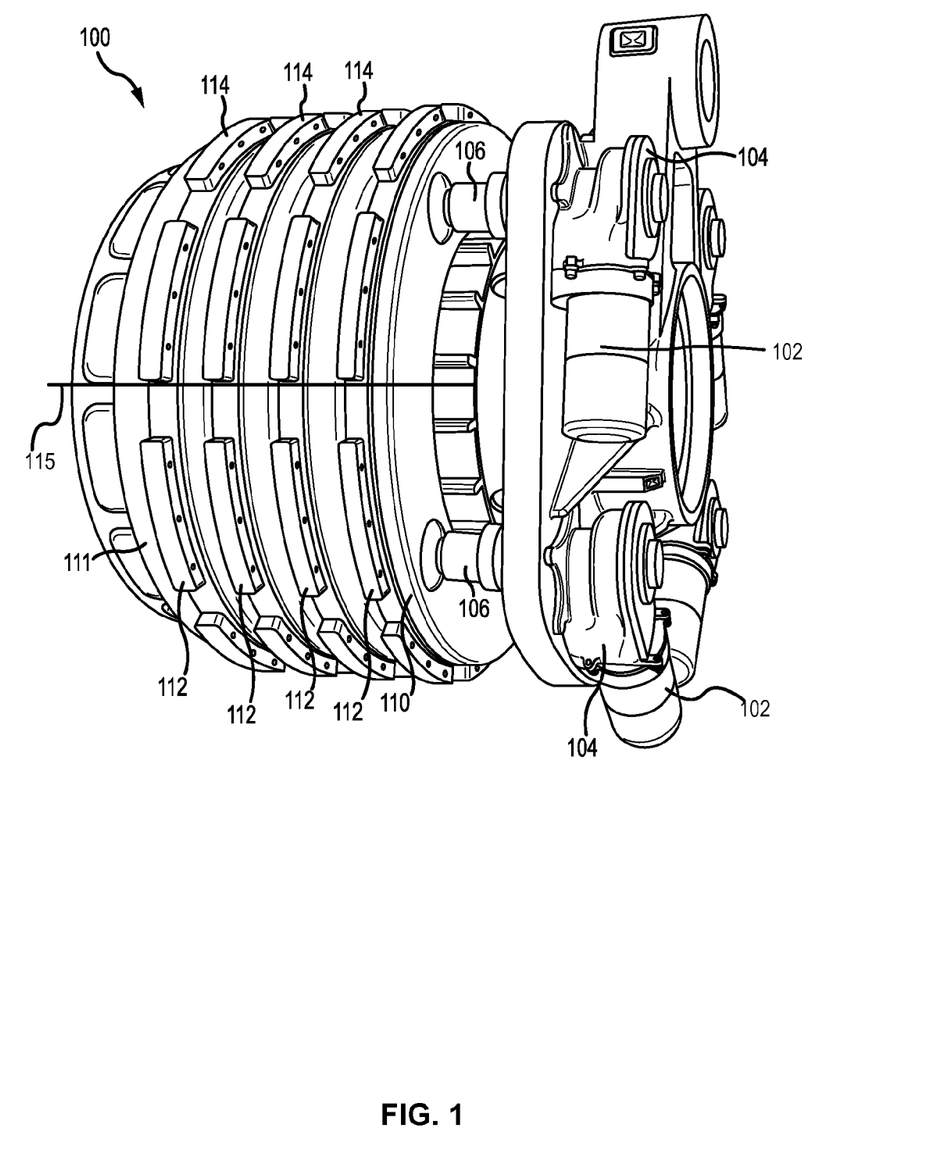
FIG. 1 illustrates an aircraft brake in accordance with various embodiments.

FIG. 1 illustrates an aircraft brake 100 in accordance with various embodiments. Aircraft brake 100 may include a plurality of actuator motors 102, a plurality of electromechanical brake actuators 104, a plurality of ball nuts 106, an end plate 111 and a pressure plate 110, and a plurality of rotating discs 112 and stators 114 positioned in an alternating fashion between end plate 111 and pressure plate 110. Rotating discs 112 may rotate about an axis 115 and the stators 114 may have no angular movement relative to axis 115. Wheels may be coupled to rotating discs 112 such that a linear speed of the aircraft is proportional to the angular speed of rotating discs 112. As force is applied to pressure plate 110 towards end plate 111 along the axis 115, rotating discs 112 and stators 114 are forced together in an axial direction. This causes the rotational speed of rotating discs 112 to become reduced (i.e., causes braking effect) due to friction between rotating discs 112, stators 114, end plate 111 and pressure plate 110. The reduction in a rotating wheel will be proportional to the amount of force exerted by the plurality of ball nuts 106. The plurality of discs 112 and stators 114, as well as pressure plate 110 and end plate 111 may be collectively referred to herein as a brake stack. The combination of the rotary actuator 104 and linear actuator ball but 106 gearing mechanisms may be referred to herein as geared drive train.

In order to exert this force onto pressure plate 110, actuator motor 102 may cause electromechanical brake actuator 104 to actuate. In various embodiments, actuator motor 102 may be a brushless motor, such as a permanent magnet synchronous motor (PMSM), a permanent-magnet motor (PMM) or the like. In various embodiments, and with reference to FIG. 2, electromechanical brake actuator 104 may be coupled to or otherwise operate a motor shaft 204 and a pressure generating device, such as, for example, a ball screw, a ram, and/or the like. In response to actuation, electromechanical brake actuator 104 causes the motor shaft 204 to rotate. Rotation of the motor shaft 204 may cause rotation of a ball screw 206, and rotational motion of the ball screw 206 may be transformed into linear motion of a ball nut 106. Accordingly, ball nut 106 may be in communication with ball screw 206. With reference again to FIG. 1, linear translation of ball nut 106 towards pressure plate 110 applies force on pressure plate 110 towards end plate 111. In various embodiments, motor shaft 204 may be coupled to ball screw 206 via rotary gear train 205. In various embodiments, rotary gear train 205 may comprise one or more gears.

Electromechanical brake actuator 104 is actuated in response to current being applied to actuator motor 102. The amount of force applied by electromechanical brake actuator 104 is related to the amount of current applied to actuator motor 102. With reference again to FIG. 2, in various embodiments, an electromechanical brake actuator control system 200 may comprise a current sensor 212 to detect an amount of current provided to actuator motor 102. Current sensor 212 may be in communication with actuator motor 102 and/or with various other components of an electromechanical brake actuator 104, an electromechanical brake actuator control system 200, and/or an aircraft. Current sensor 212 may be in communication with stiction tolerant force estimation module 220. In various embodiments, current sensor 212 may be disposed on or adjacent to actuator motor 102. However, current sensor 212 may be disposed in any location suitable for detection of electrical current supplied to the actuator motor 102.

Figure 2:
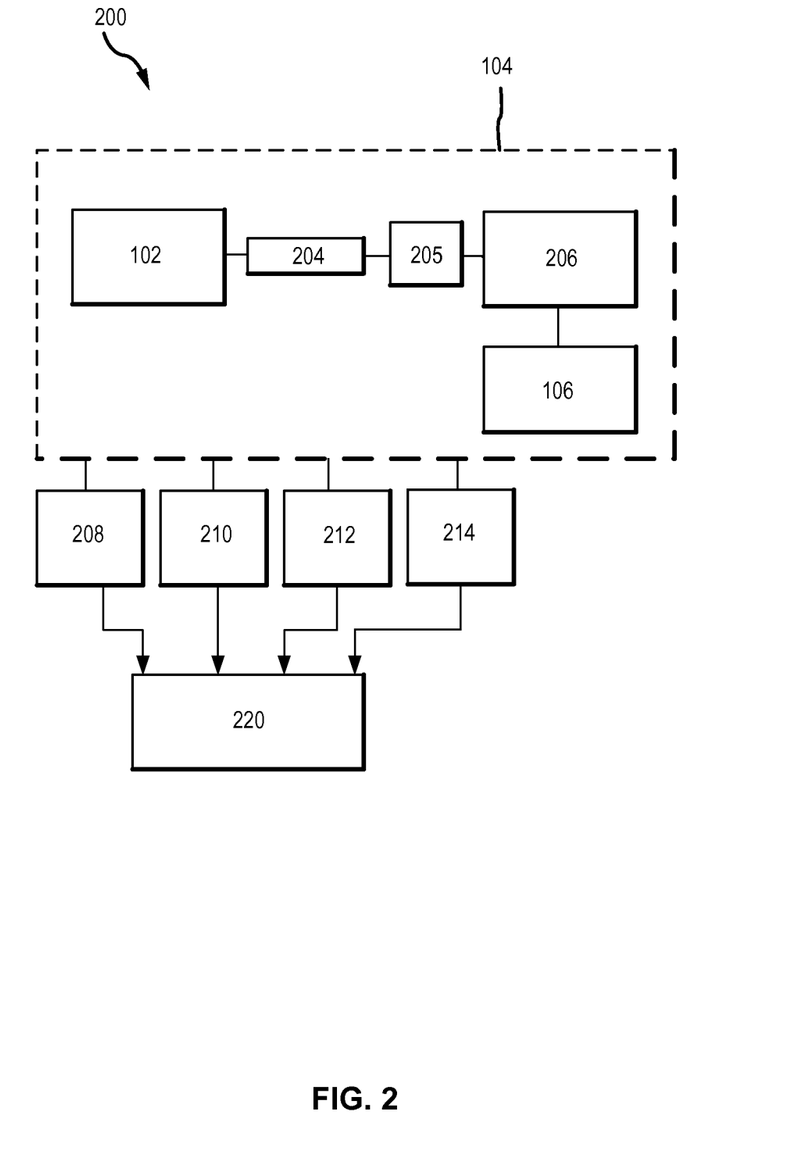
FIG. 2 illustrates a block diagram of an electromechanical brake actuator control system in accordance with various embodiments.

In various embodiments, an electromechanical brake actuator control system 200 may comprise a voltage sensor 214 to detect a voltage difference between two terminals of actuator motor 102. In various embodiments, an electromechanical brake actuator control system 200 may comprise a voltage sensor 214 to detect a voltage difference between the singular motor terminals and a chassis reference. In various embodiments, an electromechanical brake actuator control system 200 may comprise a voltage sensor 214 to detect a voltage difference between singular motor terminals and a motor winding electrical neutral reference. Voltage sensor 214 may be in communication with actuator motor 102 and/or with various other components of an electromechanical brake actuator 104, an electromechanical brake actuator control system 200, and/or an aircraft. Voltage sensor 214 may be in communication with stiction tolerant force estimation module 220. In various embodiments, voltage sensor 214 may be disposed on or adjacent to actuator motor 102. However, voltage sensor 214 may be disposed in any location suitable for detection of electrical voltage difference across actuator motor 102.

In various embodiments, an electromechanical brake actuator control system 200 may comprise a temperature sensor 210 to detect the temperature of actuator motor 102. Temperature sensor 210 may be in communication with actuator motor 102 and/or with various other components of an electromechanical brake actuator 104, an electromechanical brake actuator control system 200, and/or an aircraft. Temperature sensor 210 may be in communication with stiction tolerant force estimation module 220. In various embodiments, temperature sensor 210 may be disposed on or adjacent to actuator motor 102. However, temperature sensor 210 may be disposed in any location suitable for detection of the temperature of actuator motor 102.

Application of current to actuator motor 102 causes rotation of motor shaft 204. In various embodiments, electromechanical brake actuator control system 200 may comprise a position sensor 208. Position sensor 208 may be configured so as to measure the rotational speed and position of motor shaft 204. Position sensor 208 may be in communication with stiction tolerant force estimation module 220. In various embodiments, position sensor 208 may be disposed in or adjacent to electromechanical brake actuator 104, or on or adjacent to actuator motor 102. However, position sensor 208 may be disposed in any location suitable for detection of the rotational speed and position of motor shaft 204. In various embodiments, position sensor 208 may comprise a resolver, tachometer, or the like.

In various embodiments, a system for brake actuator operation with stiction tolerant force estimation technology comprises a brake stack, a geared drivetrain, a motor and at least one controller. The system for brake actuator operation using stiction compensation may comprise a stiction tolerant force estimation module 220. In various embodiments, stiction tolerant force estimation module 220 may be a controller and/or processor. In various embodiments, stiction tolerant force estimation module 220 may be implemented in a single controller and/or processor. In various embodiments, stiction tolerant force estimation module 220 may be implemented in multiple controllers and/or processors. In various embodiments, stiction tolerant force estimation module 220 may be implemented in an electromechanical actuator controller and/or a brake control unit.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In Re Nuijten* to fall outside the scope of patentable subject matter under 35 U.S.C. §101.

Figure 3:
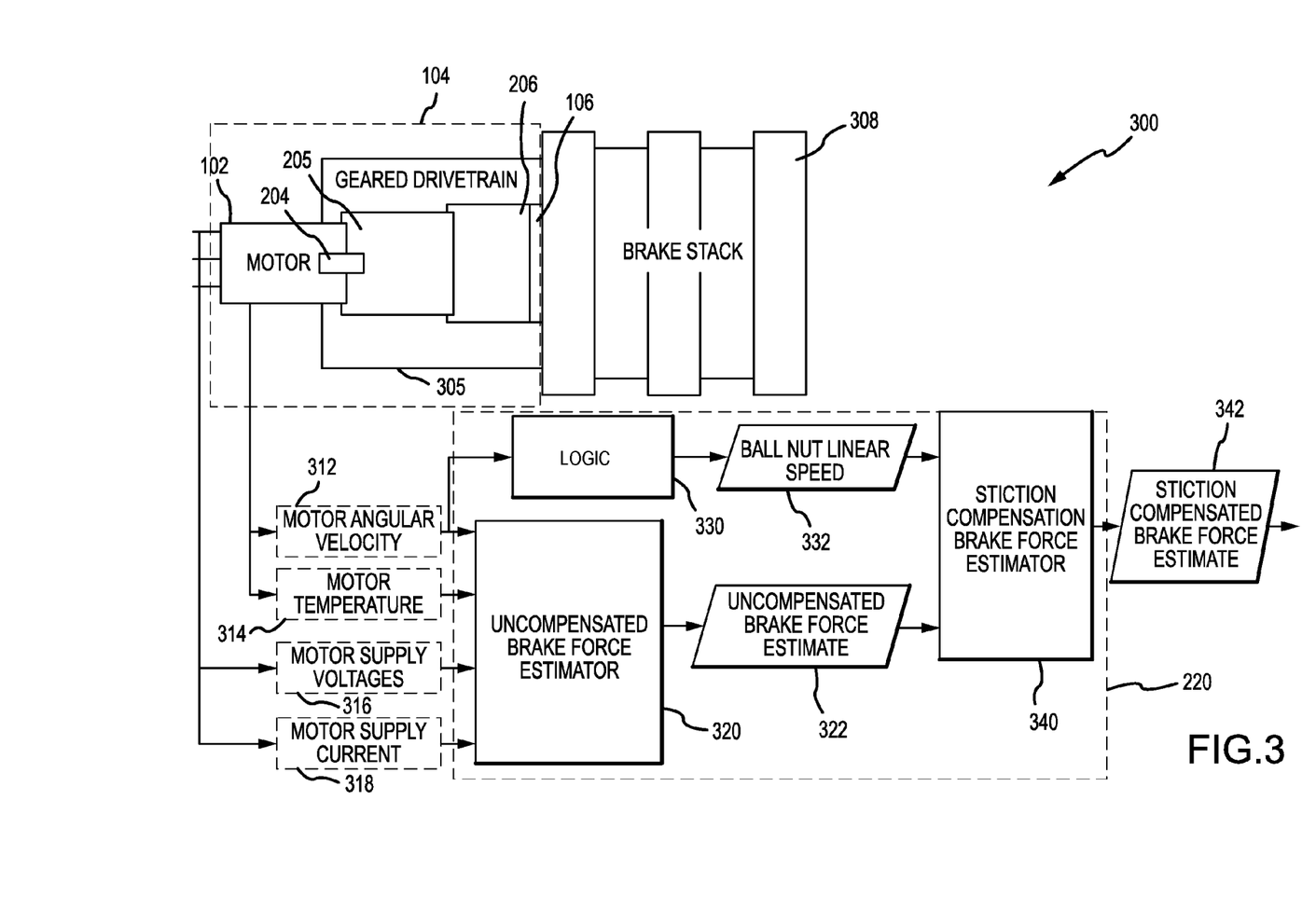
FIG. 3 illustrates a schematic view of a system for stiction fault tolerant brake estimation, in accordance with various embodiments.

With reference to FIG. 3, elements with like element numbering as depicted in FIGS. 1 and 2, are intended to be the same and will not be repeated for the sake of clarity.

FIG. 3 illustrates, in accordance with various embodiments, a system 300 for stiction fault tolerant brake force estimation and actuator control operation (hereinafter "system 300"). In various embodiments, system 300 may comprise brake stack 308, electromechanical brake actuator 104, and stiction tolerant force estimation module 220. In various embodiments, electromechanical brake actuator 104 may comprise geared drivetrain 305. Geared drivetrain 305 may comprise motor shaft 204, rotary gear train 205, ball screw 206, and ball nut 106. In various embodiments, stiction tolerant force estimation module 220 may comprise a closed-loop system. In various embodiments, stiction tolerant force estimation module 220 may be implemented in a machine-readable non-transitory medium and performed by a controller. In various embodiments, stiction tolerant force estimation module 220 may be implemented on a special use controller, field programmable gate array, or the like. In various embodiments, stiction tolerant force estimation module 220 may be implemented on one or more controllers. In various embodiments, stiction tolerant force estimation module 220 may comprise an electro-mechanical brake actuator controller (EBAC).

In various embodiments, electro-mechanical brake actuator (EBA) 104 may be coupled to brake stack 308. Stiction tolerant force estimation module 220, may receive a plurality of signals from EBA 104 which may report the state of motor 102. Stiction tolerant force estimation module 220, may receive motor angular velocity 312, motor temperature 314, motor supply voltage 316, and motor supply current 318. Accordingly, the state of motor 102, also referred to herein as motor state, may be determine by motor angular velocity 312, motor temperature 314, motor supply voltage 316, and motor supply current 318. In various embodiments, with momentary reference to FIG. 2, motor angular velocity 312 may be measured by position sensor 208. In various embodiments, motor temperature 314 may be measured by temperature sensor 210. In various embodiments, motor supply voltage 316 may be measured by voltage sensor 214. In various embodiments, motor supply current 318 may be measured by current sensor 212. Uncompensated brake force estimator 320 may use motor angular velocity 312, motor temperature 314, motor supply voltage 316, and motor supply current 318 to calculate an uncompensated brake force estimate 322. Uncompensated brake force estimator 322 may not compensate for stiction within geared drivetrain 305. Uncompensated brake force estimator 320 may output an uncompensated brake force estimate 322.

In various embodiments, stiction tolerant force estimation module 220 may comprise rotary to translation displacement logic (hereinafter "logic 330"), uncompensated brake force estimator 320, and stiction compensation brake force estimator 340. In various embodiments, motor angular velocity 312 may be directly proportional to the linear speed of ball nut 106. In various embodiments, logic 330 may use motor angular velocity 312 to calculate the linear speed of ball nut 106. Logic 330 may output ball nut linear speed 332. In various embodiments, stiction compensation brake force estimator 340 may use ball nut linear speed 332 and uncompensated brake force estimate 322 to calculate stiction compensated brake force estimate 342. In various embodiments, stiction compensated brake force estimate 342 may be used to determine the current to be supplied to motor 102. In various embodiments, stiction compensated brake force estimate 342 may be used to measure the force applied to brake stack 308.

In various embodiments, system 300 may receive a command force. The command force may be sent via an electro-mechanical brake actuator controller (EBAC). The command force may be the force which is being commanded to be applied to an electro-mechanical brake actuator (EBA) in order to apply a braking force to a vehicle such as an aircraft, for example. In various embodiments, stiction compensated brake force estimate 342 may be used as a feedback force to dynamically control applied brake force.

Figure 4:
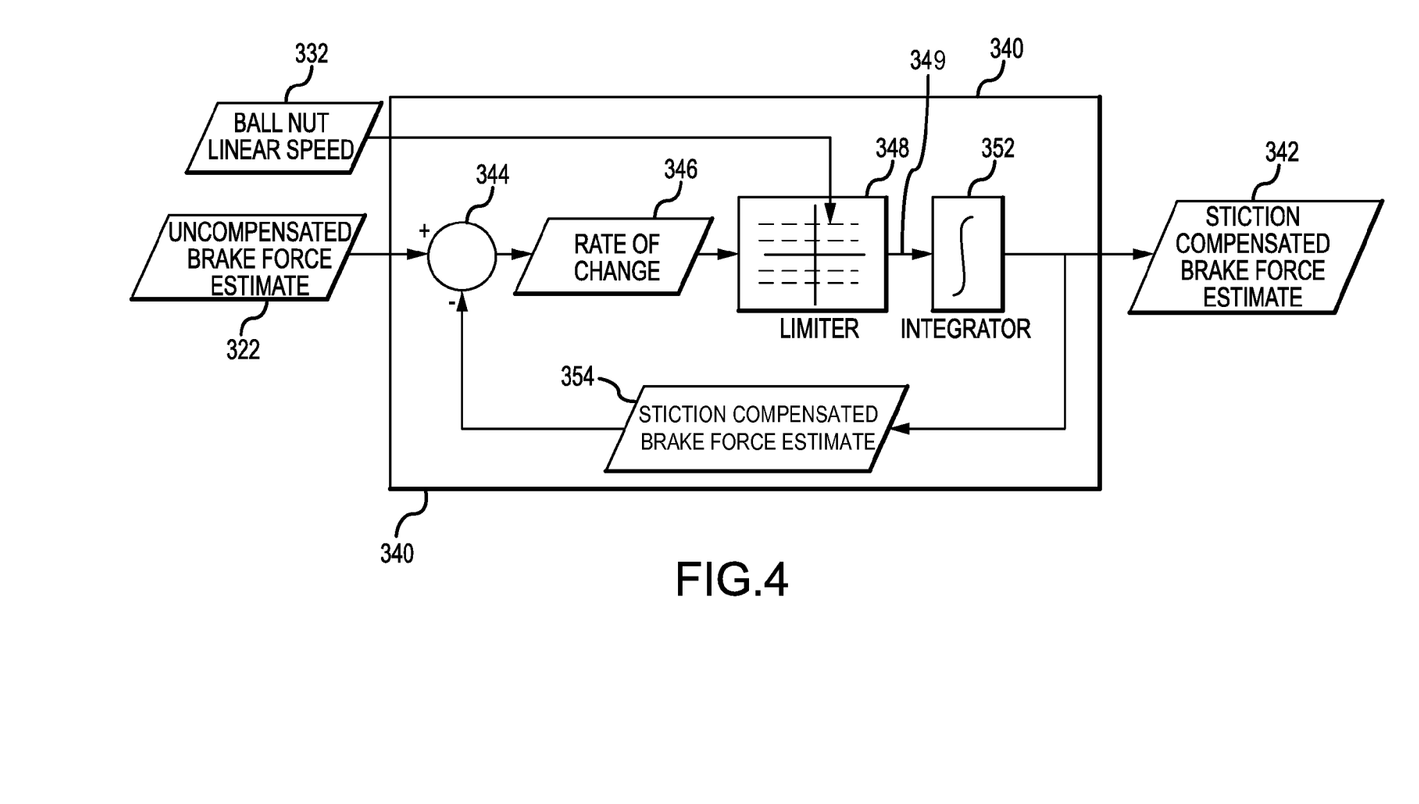
FIG. 4 illustrates a schematic view of a stiction compensation brake force estimator, in accordance with various embodiments.

With reference to FIG. 4, elements with like element numbering as depicted in FIG. 3, are intended to be the same and will not be repeated.

FIG. 4 illustrates, in various embodiments, stiction compensation brake force estimator 340. In various embodiments, stiction compensation brake force estimator 340 may comprise a rate limiting type calculation. In various embodiments, stiction compensation brake force estimator 340 may comprise summing junction 344, rate of change limiter 348 (hereinafter "limiter 348"), and integrator 352. In various embodiments, summing junction 344 may be configured to calculate brake force rate of change 346. In various embodiments, brake force rate of change 346 may comprise a signal. In various embodiments, summing junction 344 may be configured to calculate the difference between uncompensated brake force estimate 322 and stiction compensated brake force estimate 354. Limiter 348 may receive as an input ball nut linear speed 332. In various embodiments, ball nut linear speed 332 may comprise a signal. In various embodiments, limiter 348 may be configured to limit the magnitude of brake force rate of change 346 to not exceed a limiting threshold value, whereby the threshold value is determined by ball nut linear speed 332. In various embodiments, the limiting threshold value may increase in response to an increase in ball nut linear speed 332. In various embodiments, the limiting threshold value may decrease in response to a decrease in ball nut linear speed 332. In various embodiments, limiter 348 may output limited brake force rate of change 349. In various embodiments, limited brake force rate of change 349 may be equal to brake force rate of change 346 when the limiting threshold value is greater than or equal to brake force rate of change 346. In various embodiments, limited brake force rate of change 349 may be less than brake force rate of change 346 when the limiting threshold value is less than brake force rate of change 346.

In various embodiments, with momentary reference to FIG. 3, limiter 348 may be configured to limit the magnitude of brake force rate of change 346 to not exceed a limiting threshold value, whereby the threshold value is determined according to the speed of geared drivetrain 305. In various embodiments, the limiting threshold value may increase in response to an increase in the speed of geared drivetrain 305. In various embodiments, the limiting threshold value may decrease in response to a decrease in the speed of geared drivetrain 305. In various embodiments, the speed of geared drivetrain 305 may be at least one of a rotational speed and a linear speed. In various embodiments, the speed of geared drivetrain 305 may be determined according to ball nut linear speed 332. In various embodiments, the speed of geared drivetrain 305 may be determined according to the rotational speed of motor shaft 204, ball screw 206, and/or rotary gear train 205.

In various embodiments, integrator 352 may be configured to calculate stiction compensated brake force estimate 342. Stiction compensated brake force estimate 342 may comprise a signal. Integrator 352 may calculate stiction compensated brake force estimate 342 by integrating limited brake force rate of change 349 over a specified domain. The specified domain may be a time domain. The specified domain may be correlated to the sampling rate of stiction tolerant force estimation module 220. With momentary reference to FIG. 3, stiction compensated brake force estimate 342 may be used to determine the amount of current to be supplied to electromechanical brake actuator 104. Stiction compensated brake force estimate 342 may be used to determine the amount of force to be applied to brake stack 308. In various embodiments, stiction compensated brake force estimate 342 may be saved to memory. In various embodiments, stiction compensated brake force estimate 342 may be saved to memory as stiction compensated brake force estimate 354.

In an exemplary embodiment, stiction compensated brake force estimate 354 may comprise a value of seventy-five pounds (75 lbs. or 34.02 kg.), calculated at a first time. Uncompensated brake force estimate 322 may comprise a value of one hundred pounds (100 lbs. or 45.36 kg.), calculated at a second time. Summing junction 344 may calculate the difference between uncompensated brake force estimate 322 and stiction compensated brake force estimate 354, and therefore brake force rate of change 346, to be twenty-five pounds (25 lbs. or 11.34 kg.). If the limiting threshold value is equal to ten pounds (10 lbs. or 4.54 kg.), then limiter 348 may output a signal equivalent to 10 lbs. which may then be integrated by integrator 352 over a specified domain equivalent to the difference in time between the second time and the first time, thereby calculating stiction compensated brake force estimate 342. Stiction compensated brake force estimate 342, may then be saved to memory as stiction compensated brake force estimate 354 to be used at a later time in order to calculate a new stiction compensated brake force estimate.

In another particular case, with further reference to FIG. 3, where the motor angular velocity (signal) 312 is zero, due to either lack of motor supply current 318 or if the geared drive train is stopped moving due to stiction, the logic unit 330 could also output a zero ball nut linear speed 332. A ball nut linear speed 332 of zero may thereby, for instance, set a zero limit at the limiter 348. Setting zero at the limiter 348 may cause the integrator 352, which sums all previous inputs values (i.e., limited brake force rate of change 349), to add zero to the previous value. The effect of adding zero by the integrator 352 may create the effect of "latching" the last value at the output of the integrator 352. The effect of retaining a previously computed output at the integrator 352 may in turn translate to latching the previous values of stiction compensated brake force estimate 342 and stiction compensated brake force estimate 354. This particular case of zero motor angular velocity (signal) 312 will, therefore, demonstrate a case where the uncompensated force estimation 320 is corrected in response to a stuck geared drive train by way of returning the last stiction compensated brake force estimate 342.

Figure 5:
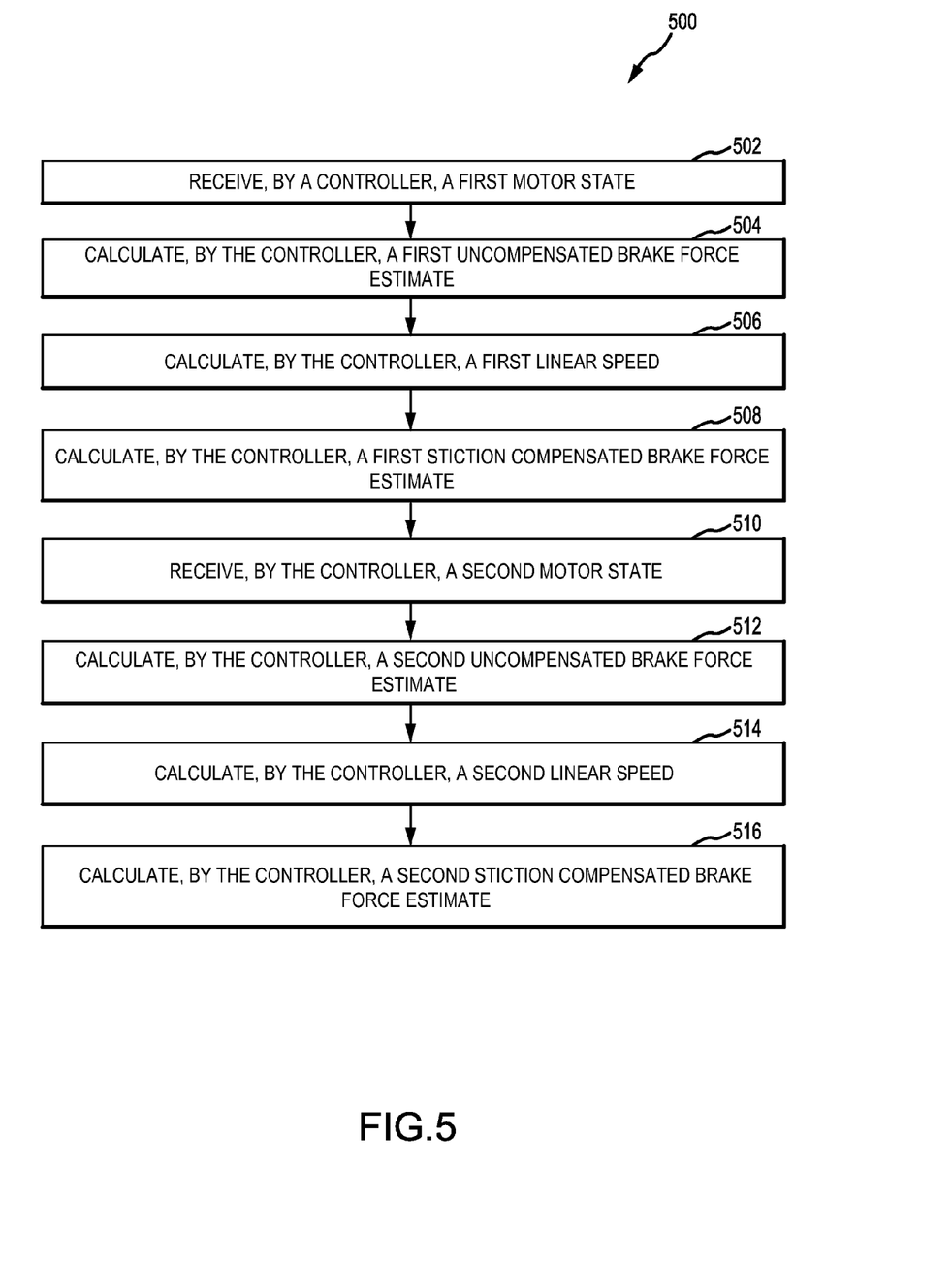
FIG. 5 illustrates a method for stiction tolerant brake force estimation, in accordance with various embodiments.

With reference to FIG. 5, in accordance with various embodiments, a method 500 for stiction tolerant brake force estimation is described herein. The method 500 may include receiving, by a controller, a first motor state in step 502. Step 504 may include calculating, by the controller, a first uncompensated brake force estimate. Step 506 may include calculating, by the controller, a first linear speed. Step 508 may include calculating, by the controller, a first stiction compensated brake force estimate.

The method 500 may further include receiving, by the controller, a second motor state in step 510. Step 512 may include calculating, by the controller, a second uncompensated brake force estimate. Step 514 may include calculating, by the controller, a second linear speed. Step 516 may include calculating, by the controller, a second stiction compensated brake force estimate.

In an exemplary embodiment, with further reference to FIG. 3, the method 500 may include receiving, by stiction tolerant force estimation module 220, a first motor state at a first time in step 502. The first motor state may include angular velocity 312, motor temperature 314, motor supply voltage 316, and motor supply current 318. Step 504 may include calculating, by uncompensated brake force estimator 320, a first uncompensated brake force estimate 322 based upon the first motor state. Step 506 may include calculating, by logic 330, a first ball nut linear speed 332 which may be based upon the first motor angular velocity 312. Step 508 may include calculating, by stiction compensation brake force estimator 340, a first stiction compensated brake force estimate 342 based upon at least one of the first ball nut linear speed 332 and the first uncompensated brake force estimate 322.

The method 500 may further include receiving, by stiction tolerant force estimation module 220, a second motor state at a first time in step 510. The second motor state may include angular velocity 312, motor temperature 314, motor supply voltage 316, and motor supply current 318. Step 512 may include calculating, by uncompensated brake force estimator 320, a second uncompensated brake force estimate 322 based upon the second motor state. Step 514 may include calculating, by logic 330, a second ball nut linear speed 332 which may be based upon the second motor angular velocity 312. Step 516 may include calculating, by stiction compensation brake force estimator 340, a second stiction compensated brake force estimate 342 based upon at least one of the second ball nut linear speed 332 and the second uncompensated brake force estimate 322.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for stiction tolerant brake force estimation comprising:
   receiving, by a controller, a first motor state at a first time;
   calculating, by the controller, a first uncompensated brake force estimate based upon the first motor state;
   calculating, by the controller, a first linear speed based upon the first motor state; and
   calculating, by the controller, a first stiction compensated brake force estimate based upon at least one of the first linear speed and the first uncompensated brake force estimate.

2. The method of claim 1, further comprising:
   receiving, by the controller, a second motor state at a second time;
   calculating, by the controller, a second uncompensated brake force estimate based upon the second motor state;
   calculating, by the controller, a second linear speed based upon the second motor state; and
   calculating, by the controller, a second stiction compensated brake force estimate based upon at least one of the second linear speed and the second uncompensated brake force estimate.

3. The method of claim 2, wherein a brake force rate of change is calculated by calculating a difference between the first stiction compensated brake force estimate and the second uncompensated brake force estimate,
   wherein a rate of change limiter uses the brake force rate of change to calculate a limited brake force rate of change,
   wherein an integrator calculates the second stiction compensated brake force estimate by integrating the limited brake force rate of change over a specified domain.

4. The method of claim 3, wherein the specified domain comprises a difference between the second time and the first time.

5. The method of claim 3, wherein the limiter uses the second linear speed to determine the limited brake force rate of change.

6. The method of claim 2, wherein the first linear speed and the second linear speed comprise a linear speed of a ball nut.

7. The method of claim 2, wherein the first motor state and the second motor state comprise at least one of a motor angular velocity, a motor temperature, a motor supply voltage, or a motor supply current.

8. A system for stiction tolerant brake force estimation, comprising:
   a controller configured to receive a motor state;
   a tangible, non-transitory memory configured to communicate with the controller, the tangible, non-transitory memory having instructions stored thereon that, in response to execution by the controller, cause the controller to perform operations comprising:
   receiving, by the controller, a first motor state at a first time;
   calculating, by the controller, a first uncompensated brake force estimate based upon the first motor state;
   calculating, by the controller, a first linear speed based upon the first motor state; and
   calculating, by the controller, a first stiction compensated brake force estimate based upon at least one of the first linear speed and the first uncompensated brake force estimate.

9. The system for stiction tolerant brake force estimation of claim 8, wherein the tangible, non-transitory memory causes the controller to perform operations further comprising:
   receiving, by the controller, a second motor state at a second time;
   calculating, by the controller, a second uncompensated brake force estimate based upon the second motor state;
   calculating, by the controller, a second linear speed based upon the second motor state; and
   calculating, by the controller, a second stiction compensated brake force estimate based upon at least one of the second linear speed and the second uncompensated brake force estimate.

10. The system for stiction tolerant brake force estimation of claim 9, wherein the tangible, non-transitory memory causes the controller to perform operations further comprising:
    calculating, by the controller, a brake force rate of change, wherein the brake force rate of change is calculated by calculating a difference between the first stiction compensated brake force estimate and the second uncompensated brake force estimate;
    calculating, by the controller, a limited brake force rate of change, the limited brake force rate of change being limited according to a drive train speed; and
    calculating, by the controller, an integral of the limited brake force rate of change over a specified domain, wherein the resulting integral is the second stiction compensated brake force estimate.

11. The system for stiction tolerant brake force estimation of claim 10, wherein the specified domain comprises a difference between the second time and the first time.

12. The system for stiction tolerant brake force estimation of claim 10, wherein the second linear speed is used to determine the limited brake force rate of change.

13. The system for stiction tolerant brake force estimation of claim 9, further comprising:
    an electro-mechanical brake actuator (EBA), wherein the EBA comprises:
    a motor, wherein a motor shaft is coupled to the motor,
    a ball screw, and
    a ball nut, wherein the ball nut is in communication with the ball screw.

14. The system for stiction tolerant brake force estimation of claim 9, wherein the first motor state and the second motor state comprise at least one of a motor angular velocity, a motor temperature, a motor supply voltage, and a motor supply current.

15. The system for stiction tolerant brake force estimation of claim 14, wherein the first uncompensated brake force estimate and the second uncompensated brake force estimate are based upon the motor angular velocity.

16. A tangible, non-transitory memory configured to communicate with a controller, the tangible, non-transitory memory having instructions stored thereon that, in response to execution by the controller, cause the controller to perform operations comprising:
receiving, by the controller, a first motor state at a first time;
calculating, by the controller, a first uncompensated brake force estimate based upon the first motor state;
calculating, by the controller, a first linear speed based upon the first motor state; and
calculating, by the controller, a first stiction compensated brake force estimate based upon at least one of the first linear speed and the first uncompensated brake force estimate.

17. The tangible, non-transitory memory of claim 16, wherein the instructions further comprise:
receiving, by the controller, a second motor state at a second time;
calculating, by the controller, a second uncompensated brake force estimate based upon the second motor state;
calculating, by the controller, a second linear speed based upon the second motor state; and
calculating, by the controller, a second stiction compensated brake force estimate based upon at least one of the second linear speed and the second uncompensated brake force estimate.

18. The tangible, non-transitory memory of claim 17, wherein the instructions further comprise:
calculating, by the controller, a brake force rate of change, wherein the brake force rate of change is calculated by calculating a difference between the first stiction compensated brake force estimate and the second uncompensated brake force estimate;
calculating, by the controller, a limited brake force rate of change, the limited brake force rate of change being limited according to a drive train speed; and
calculating, by the controller, an integral of the limited brake force rate of change over a specified domain, wherein the resulting integral is the second stiction compensated brake force estimate.

19. The tangible, non-transitory memory of claim 18, wherein the second linear speed is used to determine the limited brake force rate of change.

20. The tangible, non-transitory memory of claim 17, wherein the first motor state and the second motor state comprise at least one of a motor angular velocity, a motor temperature, a motor supply voltage, and a motor supply current.

* * * * *